United States Patent
De Haan

(10) Patent No.: US 7,974,342 B2
(45) Date of Patent: Jul. 5, 2011

(54) MOTION-COMPENSATED IMAGE SIGNAL INTERPOLATION USING A WEIGHTED MEDIAN FILTER

(75) Inventor: Gerard De Haan, Eindhoven (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1463 days.

(21) Appl. No.: 10/563,849

(22) PCT Filed: Jul. 1, 2004

(86) PCT No.: PCT/IB2004/051087
§ 371 (c)(1),
(2), (4) Date: Jan. 5, 2006

(87) PCT Pub. No.: WO2005/004479
PCT Pub. Date: Jan. 13, 2005

(65) Prior Publication Data
US 2006/0159175 A1    Jul. 20, 2006

(30) Foreign Application Priority Data

Jul. 8, 2003 (EP) .................................. 03077136
Jul. 9, 2003 (EP) .................................. 03102069

(51) Int. Cl.
*H04N 7/32* (2006.01)
*H04N 7/46* (2006.01)
*H04N 7/01* (2006.01)

(52) U.S. Cl. ......... 375/240.12; 375/240.16; 375/240.29; 348/441; 348/452

(58) Field of Classification Search ............ 375/240.16, 375/240.12, 240.29, 240.26; 382/238, 262
See application file for complete search history.

(56) References Cited

U.S. PATENT DOCUMENTS
5,495,300 A * 2/1996 de Haan et al. ............... 348/699
(Continued)

FOREIGN PATENT DOCUMENTS
WO    WO02058385 A1    7/2002

OTHER PUBLICATIONS
Franzen O, et al: Intermediate Image Interpolation Using Polyphase Weighted Median Filters, vol. 4304, Jan. 2001, pp. 306-317.
(Continued)

Primary Examiner — Scott A Rogers
(74) Attorney, Agent, or Firm — DLA Piper LLP (US)

(57) ABSTRACT

A motion-compensated image signal interpolation unit (200) for generating an interpolated image being located at a first predetermined temporal distance (a) from the first image and being located at a second predetermined temporal distance (1−a) from the second image is disclosed. The interpolation unit (200) comprises: motion estimation means (202) for furnishing a first and a second motion vector relating to the first and second image; furnishing means (204, 206) for furnishing a first group of samples on basis of values of pixels of the first image and the first motion vector and for furnishing a second group of samples on basis of values of pixels of the second image and the second motion vector, and filtering means (212) for ordered statistical filtering of the samples of the first and the second group to produce a first value of a first pixel of the interpolated image (102), whereby a first quotient is substantially equal to a second quotient, the first quotient being determined by a first spatial distance ($x_1$) between a first one of the samples of the first group and a second one of the samples of the first group and the first predetermined temporal distance ($\alpha$), the second quotient being determined by a second spatial distance ($x_2$) between a first one of the samples of the second group and a second one of the samples of the second group and the second predetermined temporal distance (1−$\alpha$).

19 Claims, 7 Drawing Sheets

U.S. PATENT DOCUMENTS

Figure 1:
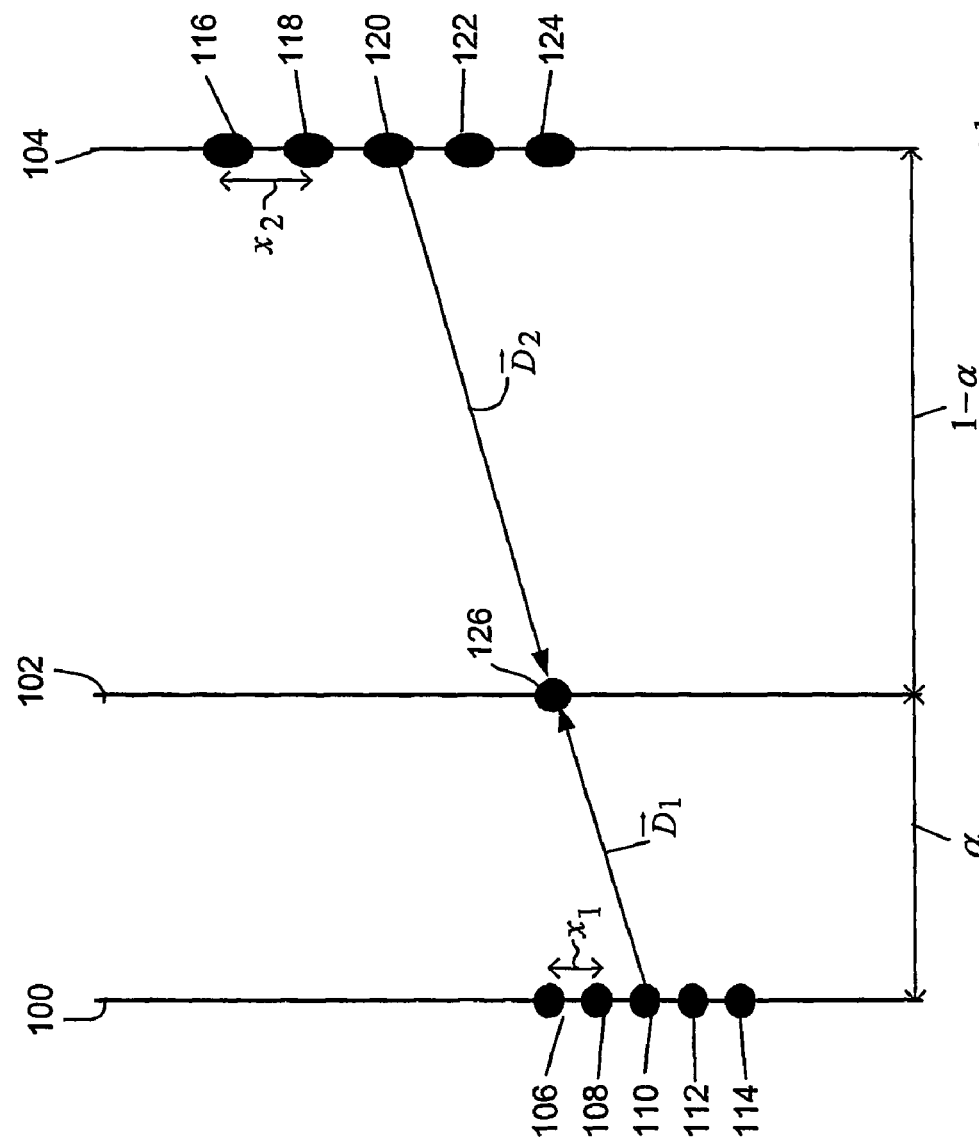

| | | | |
|---|---|---|---|
| 5,534,946 | A | 7/1996 | De Haan et al. |
| 5,777,682 | A * | 7/1998 | De Haan et al. ............... 348/452 |
| 7,564,902 | B2 * | 7/2009 | Sasai et al. ............... 375/240.26 |
| 2005/0129126 | A1 * | 6/2005 | Jeon ......................... 375/240.16 |
| 2006/0291562 | A1 * | 12/2006 | Lee et al. ................. 375/240.16 |
| 2008/0025394 | A1 * | 1/2008 | Francois et al. ......... 375/240.12 |
| 2009/0316789 | A1 * | 12/2009 | Sasai et al. ............... 375/240.16 |
| 2010/0111183 | A1 * | 5/2010 | Jeon et al. ................ 375/240.16 |

OTHER PUBLICATIONS

Gerard De Haan, et al: True Motion Estimation with 3-D Recursive Search Block Matching, vol. 3, No. 5, Oct. 1993, pp. 368-379.

"Motion-compensated scan rate conversion": Research Disclosure, Kenneth Mason Publications, Hampshire, GB, vol. 367, No. 24, Nov. 1994, XP007120062, ISSN: 0374-4353; also mentioned in CN proceedings.

Migliorati, P. et al.: "Multistage motion estimation for image interpolation": Signal Processing. Image Communication, Elsevier Science Publishers, Amsterdam, NL, vol. 7, No. 3, Sep. 1, 1995, pp. 187-199, XP004047102, ISSN: 0923-5965; also mentioned in CN proceedings.

Blume, H.: "New Algorithm for Nonlinear Vector-based Upconversion with Center Weighted Medians":, Journal of Electronic Imaging, vol. 6 (3), pp. 368-378, XP-000704802, Jul. 1997.

* cited by examiner

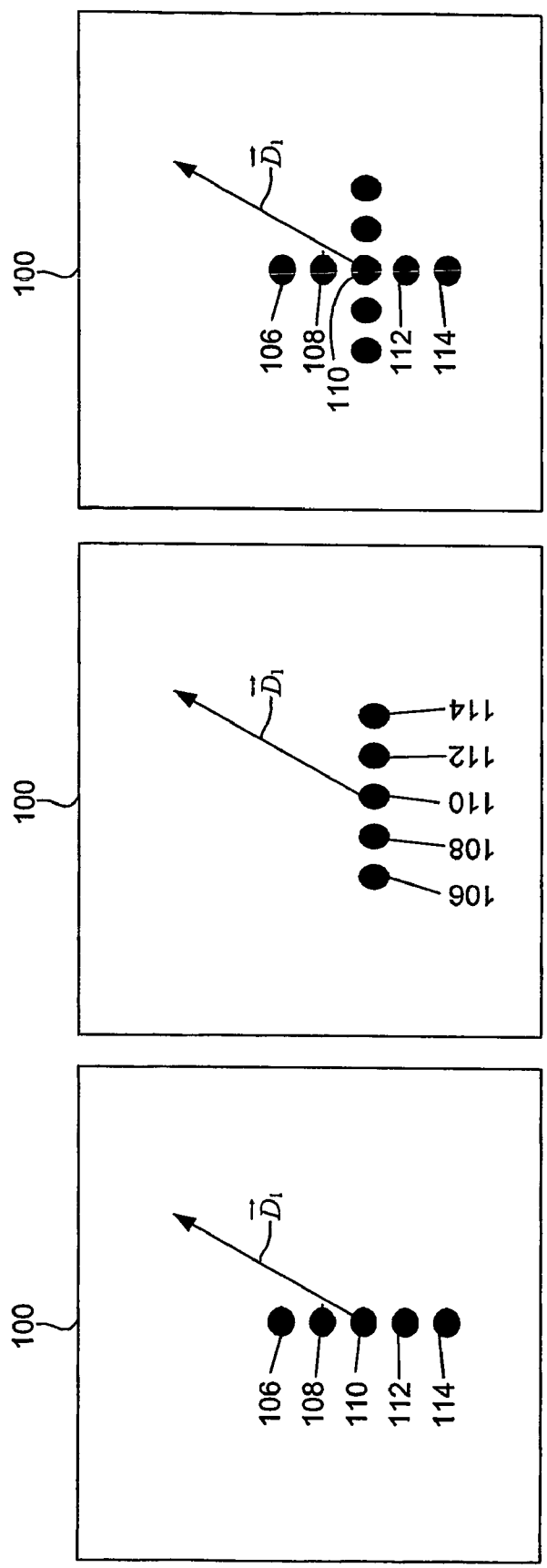

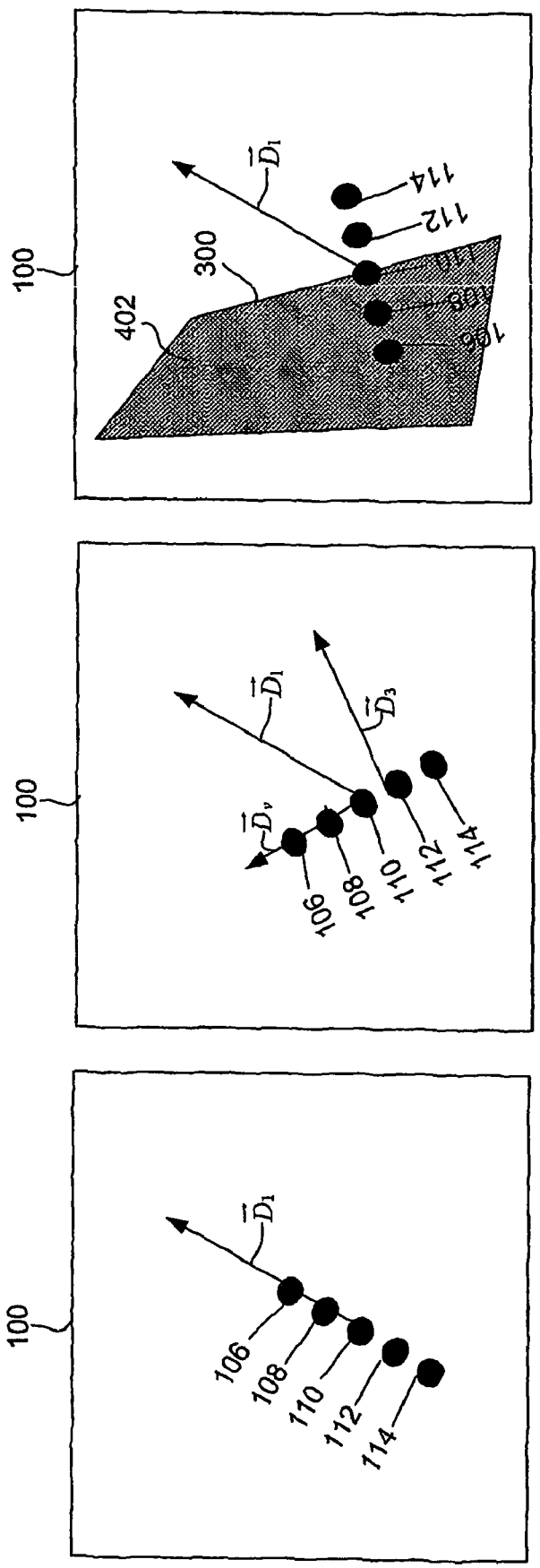

US 7,974,342 B2

MOTION-COMPENSATED IMAGE SIGNAL INTERPOLATION USING A WEIGHTED MEDIAN FILTER

RELATED APPLICATIONS/PRIORITY CLAIMS

This application claims the priority benefits under 35 USC 119 of PCT International Application PCT/IB2004/051087, filed Jul. 1, 2004, which claims priority to and the benefit under 35 USC 119 of European Patent Application No. 03077136.4 filed on Jul. 8, 2003 and European Patent Application No. 03102069.6 filed on Jul. 9, 2003. The application also claims priority to and the benefit under 35 USC 119 of European Patent Application No. 03077136.4 filed on Jul. 8,2003 and European Patent Application No. 03102069.6 filed on Jul. 9. 2003.

The invention relates to a motion-compensated image signal interpolation unit for generating an interpolated image intermediate a first and a second image, the interpolated image being located at a first predetermined temporal distance from the first image and being located at a second predetermined temporal distance from the second image, the interpolation unit comprising:

motion estimation means for furnishing a first and a second motion vector relating to the first and second image;

furnishing means for furnishing a first group of samples on basis of values of pixels of the first image and the first motion vector and for furnishing a second group of samples on basis of values of pixels of the second image and the second motion vector; and filtering means for ordered statistical filtering of the samples of the first and the second group to produce a first value of a first pixel of the interpolated image.

The invention further relates to an image processing apparatus comprising:

receiving means for receiving an image signal representing a first and a second image; and such a motion-compensated image signal interpolation unit coupled to the receiving means, for generating an interpolated image intermediate the first and the second image, the interpolated image being located at a first predetermined temporal distance from the first image and being located at a second predetermined temporal distance from the second image.

The invention further relates to a method of generating an interpolated image intermediate a first and a second image, the interpolated image being located at a first predetermined temporal distance from the first image and being located at a second predetermined temporal distance from the second image, the method comprising:

furnishing a first and a second motion vector relating to the first and second image;

furnishing a first group of samples on basis of values of pixels of the first image and the first motion vector and for furnishing a second group of samples on basis of values of pixels of the second image and the second motion vector, and ordered statistical filtering of the samples of the first and the second group to produce a first value of a first pixel of the interpolated image.

The invention further relates to a computer program product to be loaded by a computer arrangement, comprising instructions to generate an interpolated image intermediate a first and a second image, the interpolated image being located at a first predetermined temporal distance from the first image and being located at a second predetermined temporal distance from the second image, the computer arrangement comprising processing means and a memory, the computer program product, after being loaded, providing said processing means with the capability to carry out:

furnishing a first and a second motion vector relating to the first and second image;

furnishing a first group of samples on basis of values of pixels of the first image and the first motion vector and for furnishing a second group of samples on basis of values of pixels of the second image and the second motion vector; and ordered statistical filtering of the samples of the first and the second group to produce a first value of a first pixel of the interpolated image.

An embodiment of the unit of the kind described in the opening paragraph is known from the U.S. Pat. No. 5,534, 946. In U.S. Pat. No. 5,534,946 a motion-compensated picture signal interpolation apparatus is disclosed, comprising switched memories for furnishing motion-compensated pixel values corresponding to at least two motion vectors. The motion-compensated pixel values are processed by means of an ordered statistical filter.

When very complex and fast movements in the image cannot be estimated correctly, for example, because they are outside the estimator range or because the velocity field is very inconsistent, estimated motion vectors are incorrect and a motion-compensated interpolation based on these motion vectors yields erroneous results. Subjectively, artifacts arising from such incorrect motion vectors are very disturbing at transients and in the neighborhood of stationary objects, since they tend to be concentrated in an isolated, conspicuous spot on the screen, especially when there is high spatial detail. In other words, the quality of the interpolation, and in particular the preservation of edges, depends on the quality of the motion vectors.

It is an object of the invention to provide an image signal interpolation unit of the kind described in the opening paragraph which is arranged to substantially preserve edges relatively independent of the quality of the motion vectors.

This object of the invention is achieved in that there is a first quotient which is substantially equal to a second quotient, the first quotient being determined by a first spatial distance between a first one of the samples of the first group and a second one of the samples of the first group and the first predetermined temporal distance, the second quotient being determined by a second spatial distance between a first one of the samples of the second group and a second one of the samples of the second group and the second predetermined temporal distance.

The interpolation, i.e. the computation of pixel values of the interpolated image is based on samples derived from the first image and the second image. However the density of samples in the first image is in general different from the density of samples in the second image, as the first temporal distance is different from the second temporal distance. That means that the spatial distance between the left sample and the right sample of the first group, i.e. the spatial coverage in the first image, is larger or smaller than the spatial distance between the left sample and the right sample of the second group, i.e. the spatial coverage in the second image.

Preferably the number of samples in the first group and the second group are mutually equal. The number of samples in the first group and the second group are predetermined, i.e. fixed. That means that the number of samples is independent of the first temporal distance. The spatial coverage in the first image is related to the first temporal distance and the spatial coverage in the second image is related to the second temporal distance. So, a third quotient is substantially equal to a fourth quotient, the third quotient being determined by the spatial coverage in the first image and the first predetermined temporal distance, the fourth quotient being determined by the spatial coverage in the second image and the second predetermined temporal distance.

The spatial coverage in the first image is related to the maximum error in the first motion vector for which correction can be achieved. Suppose that the first motion vector connects the first pixel of the interpolated image and the central sample of the first group of samples. Then the other samples of the first group are located around this central sample within a spatial environment in which an appropriate sample could be fetched taking into account the error in the first motion vector. The spatial environment is related to the first temporal distance, since the further away from the first image, the bigger the effective spatial deviation being caused by the error in the first motion vector.

In an embodiment of the motion-compensated image signal interpolation unit according to the invention the filtering means include a median filter. Preferably, a weighted median filter is applied. That means that the samples of the first group and of the second group are repeated with respective integer weighting coefficients and then ordered. It is also possible to first order the samples and then repeat the samples with a weight higher than 1. As a consequence the total set of ordered samples comprises multiple samples that are based on a single sample of e.g. the first group of samples.

In an embodiment of the motion-compensated image signal interpolation unit according to the invention comprising the weighted median filter, a particular weighting coefficient of the weighted median filter for weighting a particular sample of the first group of samples is higher than each of the further weighting coefficients for weighting further respective samples of the first group of samples, the particular sample being located in the center of the first group of samples. Preferably, the particular weighting coefficient is higher than the sum of the further weighting coefficients.

In an embodiment of the motion-compensated image signal interpolation unit according to the invention a second value corresponding to the first one of the samples of the first group equals a third value of a third one of the pixels of the first image. In other words, the first one of the samples directly corresponds to a pixel value of the first image. An advantage of this embodiment is that the establishing of the samples is relatively easy.

In an embodiment of the motion-compensated image signal interpolation unit according to the invention a second value corresponding to the first one of the samples of the first group is computed by means of interpolation of a third value of a third one of the pixels of the first image and a fourth value of a fourth one of the pixels of the first image in a spatial environment of the third one of the pixels. In other words, the first one of the samples corresponds to a combination of two or more pixel values of the first image.

Now it can be defined what substantially equal means. As said, the first spatial distance between samples in the first group is first of all based on the first temporal distance. The acquisition of these samples is either based on direct selection of pixel values from a predetermined grid corresponding to the first image or based on interpolation of a number of pixel values of that grid. It will be clear that direct selection is preferred regarding to computing resource usage. Because of that it is advantageous to directly select pixel values, resulting in a truncation or rounding error. As a consequence, the first spatial distance is not exactly related to the first temporal distance but substantially. The same holds for the spatial coverage in the first image related to the first temporal distance. Similar considerations are applicable to the samples of the second group of samples.

In an embodiment of the motion-compensated image signal interpolation unit according to the invention a direction of a line segment, connecting the first one of the samples of the first group and the second one of the samples of the first group, corresponds with the first motion vector. In other words, the samples of the first group are not arbitrarily acquired in a spatial environment around the central sample, but are disposed on a line which is directed corresponding to the first motion vector.

In an embodiment of the motion-compensated image signal interpolation unit according to the invention a direction of a line segment, connecting the first one of the samples of the first group and the second one of the samples of the first group, corresponds with a difference vector, the difference vector corresponding to a difference between the first motion vector and a third motion vector in a spatial environment of the first motion vector. In other words, the samples of the first group are disposed on a line which is directed corresponding to the difference motion vector. Preferably the third motion vector corresponds with a vector which substantially differs from the first motion vector.

An embodiment of the motion-compensated image signal interpolation unit according to the invention further comprises edge-detection means for detecting an orientation of an edge in the first image and whereby a direction of a line segment, connecting the first one of the samples of the first group and the second one of the samples of the first group, is orthogonal to the orientation of an edge. An advantage of this embodiment according to the invention is that the preservation of edges is further improved.

A second aspect of the invention provides an image processing apparatus as defined in claim 11. The image processing apparatus optionally comprises a display device for displaying the interpolated image and preferably also the first and second image. The image processing apparatus might e.g. be a TV, a set top box, a VCR (Video Cassette Recorder) player, a satellite tuner, a DVD (Digital Versatile Disk) player or recorder.

A third aspect of the invention provides a method as defined in claim 13.

A fourth aspect of the invention provides a computer program product as defined in claim 14.

Modifications of the image signal interpolation unit and variations thereof may correspond to modifications and variations thereof of the image processing apparatus, the method and the computer program product, being described.

Figure 2:
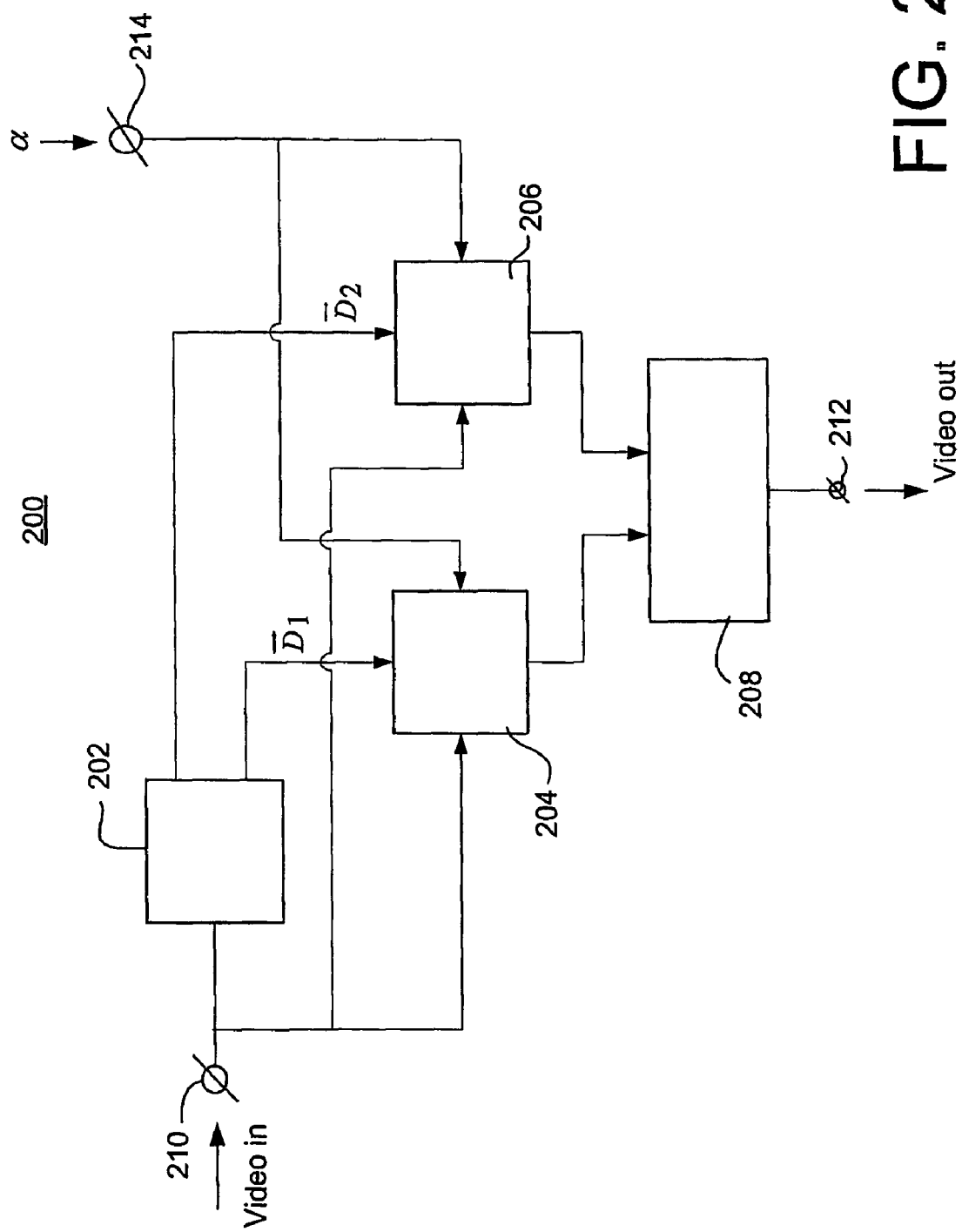
Figure 3A:
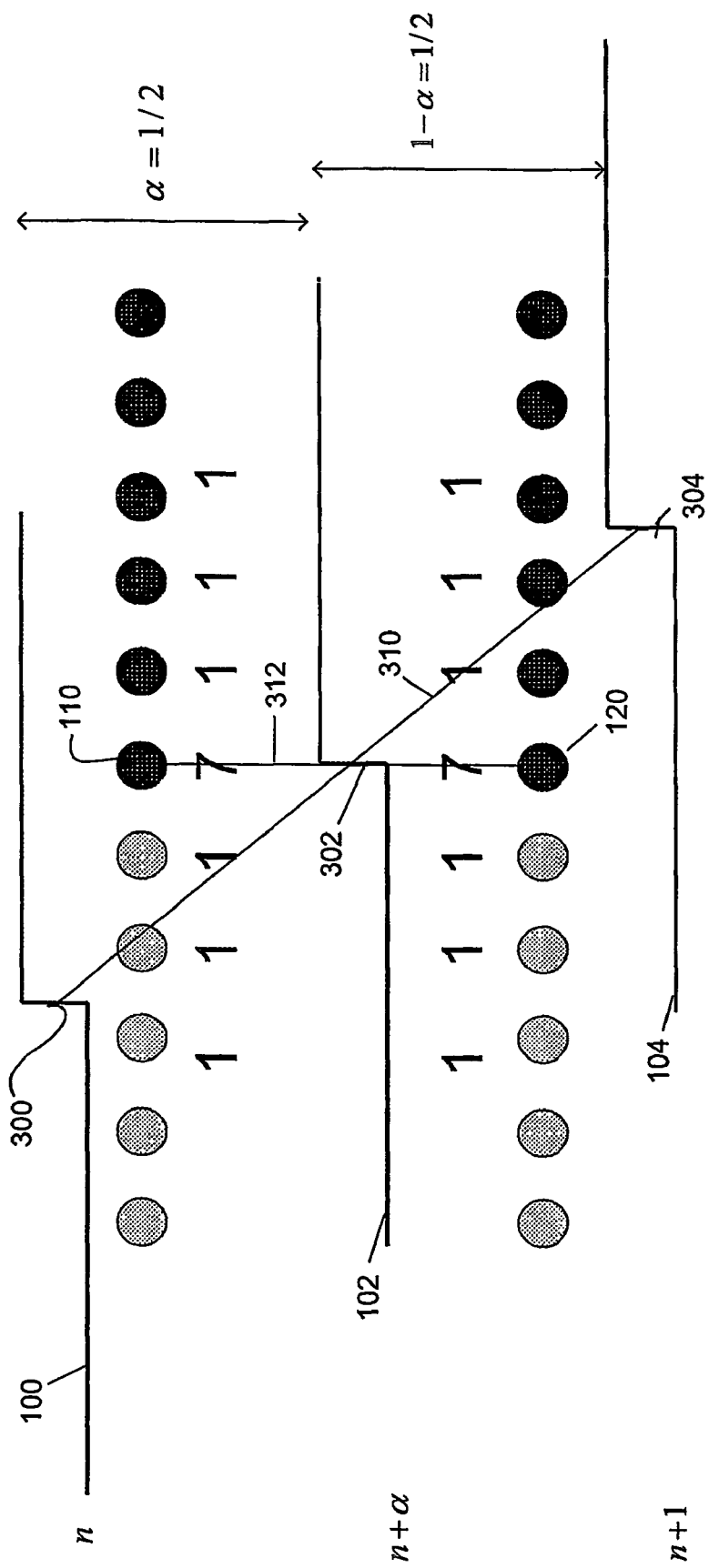
Figure 3B:
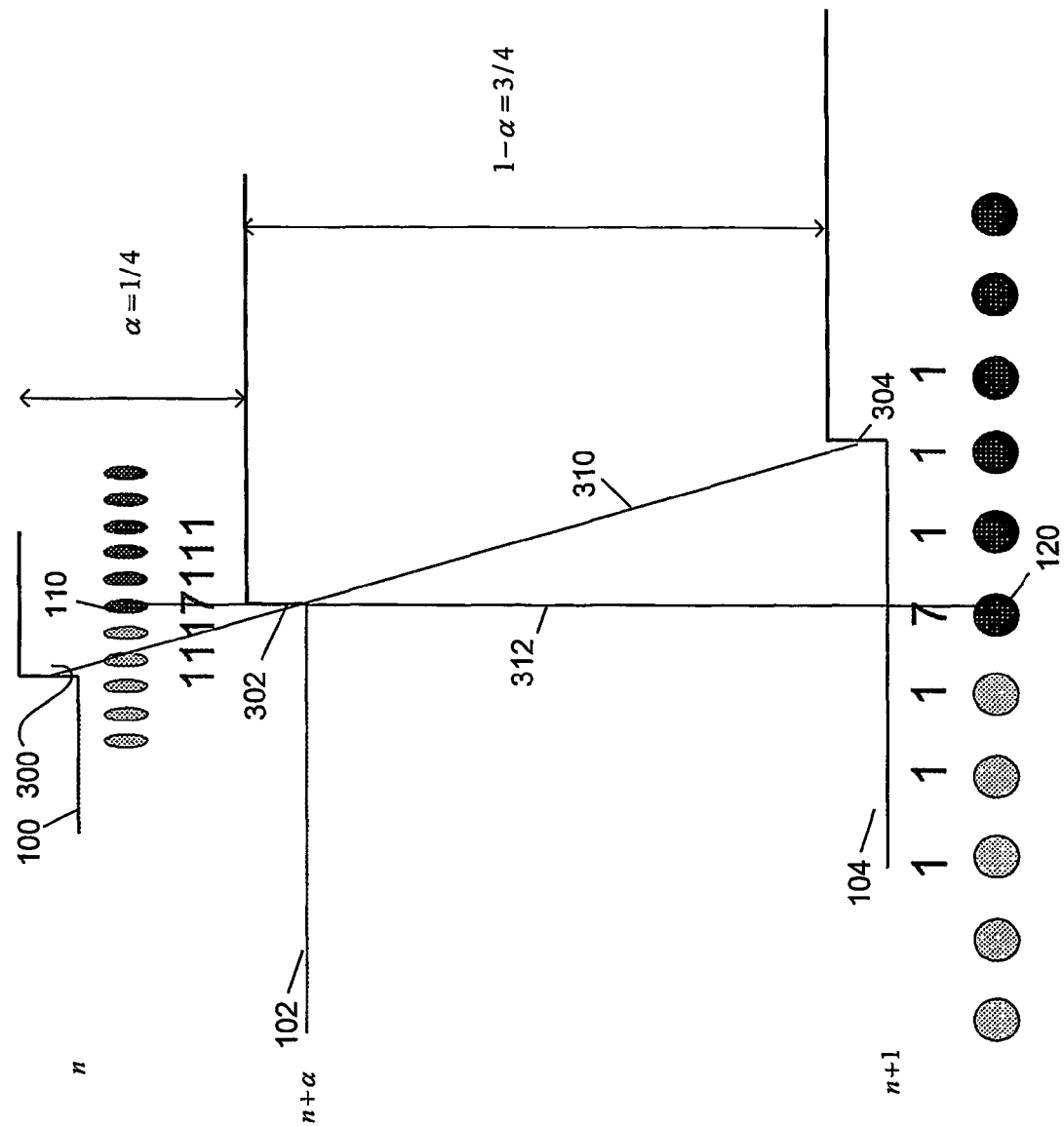
Figure 5:
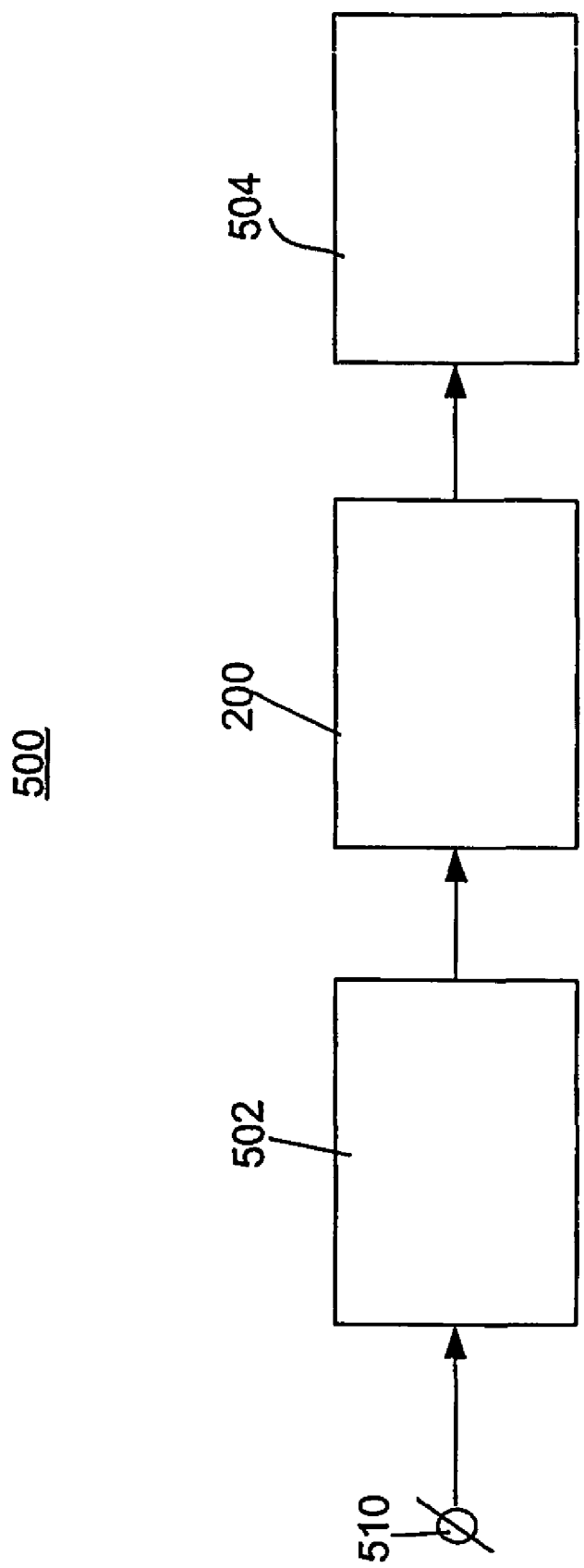

These and other aspects of the image signal interpolation unit, of the image processing apparatus, of the method and of the computer program product, according to the invention will become apparent from and will be elucidated with respect to the implementations and embodiments described hereinafter and with reference to the accompanying drawings, wherein:

FIG. 1 schematically shows two input images and an interpolated image intermediate to these input images;

FIG. 2 schematically shows an embodiment of the image signal interpolation unit according to the invention;

FIG. 3A schematically shows edges in two input images and in the interpolated image intermediate to these input images with $\alpha=\frac{1}{2}$;

FIG. 3B schematically shows edges in two input images and in the interpolated image intermediate to these input images with $\alpha=\frac{1}{4}$;

FIG. 4A schematically shows samples of the first group of samples being disposed vertically related to the central sample;

FIG. 4B schematically shows samples of the first group of samples being disposed horizontally related to the central sample;

FIG. 4C schematically shows samples of the first group of samples being disposed vertically related to the central sample and samples being disposed horizontally related to the central sample;

FIG. 4D schematically shows samples of the first group of samples being disposed in a direction corresponding to the first motion vector;

FIG. 4E schematically shows samples of the first group of samples being disposed in a direction corresponding to a difference motion vector;

FIG. 4F schematically shows samples of the first group of samples being disposed in a direction orthogonal to an edge; and FIG. 5 schematically shows an embodiment of the image processing apparatus according to the invention.

Same reference numerals are used to denote similar parts throughout the Figures.

FIG. 1 schematically shows two input images 100 and 104 and an interpolated image 102 intermediate to these input images 100 and 104. The first input image 100 corresponds to time n and the second input image 104 corresponds to time n+1. The intermediate image 102 corresponds to time n+α, with 0<α<1. Hence, the first temporal distance between the first input image 100 and the interpolated image 102 is equal to α and the second temporal distance between the second input image 104 and the interpolated image 102 is equal to 1−α.

A particular pixel 126 of the intermediate image 102 is computed on basis of an order statistical operation on a set of samples comprising a first group of samples 106-114 which are derived from the first input image 100 and a second group of samples 116-124 which are derived from the second input image 104. The relation between the first group of samples 106-114 and the particular pixel 126 of the intermediate image 102 is determined by the first motion vector $\vec{D}_1$. In particular the first motion vector $\vec{D}_1$ connects the particular pixel 126 and the central sample 110 of the first group of samples. The relation between the second group of samples 116-124 and the particular pixel 126 of the intermediate image 102 is determined by the second motion vector $\vec{D}_2$. In particular the second motion vector $\vec{D}_2$ connects the particular pixel 126 and the central sample 120 of the second group of samples.

The first spatial distance $x_1$ between a first one 108 of the samples of the first group and a second one 106 of the samples of the first group is based on the first temporal distance α. The relation between the first spatial distance $x_1$ and the first temporal distance α is called the first quotient.

In the case that an analogue video signal is provided to the image signal interpolation unit according to the invention, then the acquisition of the samples of the first and second group can be directly controlled on basis of the first temporal distance α. However, if the sampling of a received video signal, i.e. determining of pixel values, is performed in another part of the image processing apparatus with a predetermined sampling grid, i.e. fixed spatial distance, then alternative measures might be required to create the first group of samples 106-114. The first group of samples might be formed by taking only the values of a part of the pixels in a particular neighborhood around the central pixel, which is connected to the first pixel of the interpolated image 102. That means that sub-sampling is applied, so e.g. each second or third pixel is taken. Alternatively the samples of the first group of samples 106-114 are computed by means of interpolation of available pixel values.

The second spatial distance $x_2$ between a first one 118 of the samples of the second group and a second one 116 of the samples of the second group is based on the second temporal distance 1−α. The relation between the second spatial distance $x_2$ and the second temporal distance 1−α is called the second quotient. The first quotient is substantially equal to a second quotient:

$$\frac{\alpha}{x_1} = \frac{1-\alpha}{x_2} \quad (1)$$

FIG. 2 schematically shows an embodiment of the interpolation unit 200 according to the invention. The interpolation unit 200 is provided at its input connector 210 with a video signal comprising a first image 100 and a second image 104. The interpolation unit 200 is arranged to compute an interpolated image 102 intermediate the first 100 and the second image 104. The interpolated image 100 is located at a first predetermined temporal distance a from the first image 100 and is located at a second predetermined temporal distance 1−α from the second image 104. The interpolated image 102, the first image 100 and the second image are provided at the output connector 212 of the interpolation unit 200.

The interpolation unit 200 comprises:

a motion estimation unit 202 for furnishing a first $\vec{D}_1$ and a second $\vec{D}_2$ motion vector relating to the first 100 and second image 102;

a first sample generation unit 204 for generating a first group of samples 106-114 on basis of values of pixels of the first image 100, the first motion vector $\vec{D}_1$ and the first predetermined temporal distance α. The required input is provided by means of the input connector 210, the motion estimation unit 202 and the control interface 214, respectively;

a second sample generation unit 206 for generating a second group of samples 116-124 on basis of values of pixels of the second image 104, the second motion vector $\vec{D}_2$ and the second predetermined temporal distance 1−α. The required input is provided by means of the input connector 210, the motion estimation unit 202 and the control interface 214, respectively; and a central weighted median filter 208 for filtering of the samples of the first 106-114 and the second 116-124 group to produce a first value of a first pixel of the interpolated image.

The working of the interpolation unit 200 is as follows. Suppose that the value of a first pixel 126 of the interpolated image 102 has to be computed, with the first predetermined temporal distance α=¼. The first motion vector $\vec{D}_1$, related to the first pixel 126, is known. This first motion vector $\vec{D}_1$ links the first pixel 126 to a first particular pixel 110 in the first image 100. This first particular pixel 110 is taken as a central sample for the first group of samples. Subsequently, in the spatial environment of this first particular pixel, further samples are computed. Suppose the first image comprises a discrete set of pixels being disposed 1 mm from each other.

Then the first group of samples comprises samples which have a first spatial distance $x_1$ from each other of ¼ mm. The first quotient is $$\frac{\alpha}{x_1} = \frac{1/4}{1/4}.$$

The first group of samples comprises 7 samples in total.

The second motion vector $\vec{D}_2$, related to the first pixel 126, is known. This second motion vector $\vec{D}_2$ links the first pixel 126 to a second particular pixel 120 in the second image 120. This second particular pixel 120 is taken as a central sample for the second group of samples. Subsequently, in the spatial environment of this second particular pixel, further samples are computed. The second group of samples comprises samples which have a second spatial distance $x_2$ from each other of ¾ mm. The second quotient is $$\frac{1-\alpha}{x_2} = \frac{3/4}{3/4}.$$

The second group of samples comprises 7 samples in total.

It will be clear that the first spatial distance $x_1$ and the second spatial distance $x_2$ might also have been chosen to be both 4 times higher. That means that the first group of samples is based on a number of adjacent pixels and the second group of pixels is based on a number of pixels based on sub-sampling in the environment of the second particular pixel.

The two groups of samples are provided to the central weighted median filter 208. The central sample of the first group and the sample of the second group are weighted with relatively high weighting coefficients, i.e. equal to 7. The other samples with weighting coefficients being equal to 1. That means that the weighting coefficients for the first group of samples are: 1, 1, 1, 7, 1, 1 and 1, respectively and that the weighting coefficients for the second group of samples are: 1, 1, 1, 7, 1, 1 and 1, respectively.

The eventual value of the first pixel 126 corresponds with the value of the median of the total set of samples.

It will be clear that the groups of samples might also comprise more samples and that these samples might also be taken from a two-dimensional environment from the central pixel.

The motion estimation unit 202 is e.g. as specified in the article "True-Motion Estimation with 3-D Recursive Search Block Matching" by G. de Haan et. al. in IEEE Transactions on circuits and systems for video technology, vol. 3, no. 5, October 1993, pages 368-379.

The generation of samples is defined by the following constraint: a first quotient is substantially equal to a second quotient, the first quotient being determined by a first spatial distance between a first one of the samples of the first group and a second one of the samples of the first group and the first predetermined temporal distance, the second quotient being determined by a second spatial distance between a first one of the samples of the second group and a second one of the samples of the second group and the second predetermined temporal distance.

The motion estimation unit 202, the first sample generation unit 204, the second sample generation unit 206 and the central weighted median filter 208 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 3A schematically shows two input images 100 and 104 and an interpolated image 102 intermediate to these input images 100 and 104. The first input image 100 corresponds to time n and the second input image 104 corresponds to time n+1. The intermediate image 102 corresponds to time n+α, with α=½. Hence, the first temporal distance between the first input image 100 and the interpolated image 102 and the second temporal distance between the second input image 104 and the interpolated image 102 are mutually equal. In the first image 100 is a first edge 300, which means there is a transient in luminance. Also in the second image 104 there is a second edge 304 corresponding to the first edge 300 in the first image. Because of the appropriate selection of samples in the first image 100 and samples in the second image 104 the third edge 302 in the interpolated image is located at the correct position, as can be seen by the mirror line 310 and the align line 312. The central sample 110 of the first image 100 has the largest weighting coefficient of all samples of the first group. The central sample 120 of the second image 104 has the largest weighting coefficient of all samples of the second group.

FIG. 3B schematically shows edges 300-304 in two input images 100, 104 and in the interpolated image 102 intermediate to these input images with α=¼. A difference with FIG. 3A is that the first spatial distance $x_1$ between samples derived from the first image 100 is smaller than the second spatial distance $x_2$ between samples derived from the second image 104.

FIG. 4A schematically shows samples 106-114 of the first group of samples being disposed vertically related to the central sample 110. The central sample 110 is located on the first motion vector $\vec{D}_1$ connected to the first pixel 126 of the interpolated image 102. These samples 106-114 might correspond to pixel values being located on a predetermined pixel grid. Alternatively these samples 106-114 are based on interpolation of pixel values of that predetermined pixel grid.

FIG. 4B schematically shows samples 106-114 of the first group of samples being disposed horizontally related to the central sample. The central sample 110 is located on the first motion vector $\vec{D}_1$ connected to the first pixel 126 of the interpolated image 102. These samples 106-114 might correspond to pixel values being located on a predetermined pixel grid. Alternatively these samples 106-114 are based on interpolation of pixel values of that predetermined pixel grid.

FIG. 4C schematically shows samples 106-114 of the first group of samples being disposed vertically related to the central sample 110 and samples being disposed horizontally related to the central sample 110. These samples 106-114 might correspond to pixel values being located on a predetermined pixel grid. Alternatively these samples 106-114 are based on interpolation of pixel values of that predetermined pixel grid.

FIG. 4D schematically shows samples 106-114 of the first group of samples being disposed in a direction corresponding to the first motion vector $\vec{D}_1$. In other words, a direction of a line segment, connecting a first one of the samples 106 and a second one of the samples 114 corresponds with the direction of the first motion vector $\vec{D}_1$. This selection approach is advantageous if the direction of the first motion vector $\vec{D}_1$ is substantially correct but the length is not correct.

FIG. 4E schematically shows samples 106-114 of the first group of samples being disposed in a direction corresponding to a difference motion vector $\vec{D}_v$. In other words, a direction of a line segment, connecting a first one of the samples 106 and a second one of the samples 114 corresponds with a difference vector $\vec{D}_v$. This difference vector $\vec{D}_v$ corresponds to a difference between the first motion vector $\vec{D}_1$ and a third motion vector $\vec{D}_3$ in a spatial environment of the first motion vector $\vec{D}_1$. Preferably the third motion vector $\vec{D}_3$ is the motion vector in the spatial environment of the first motion vector $\vec{D}_1$ which has a maximum difference with the first motion vector $\vec{D}_1$.

FIG. 4F schematically shows samples 106-114 of the first group of samples being disposed in a direction orthogonal to an edge 300 of an object 402 in the first image 100. The edge 300 has been determined by means of an edge-detection unit.

FIG. 5 schematically shows an embodiment of the image processing apparatus 500 according to the invention, comprising:
- receiving means 502 for receiving a signal representing images;
- the motion-compensated image signal interpolation unit 200 as described in connection with FIGS. 2 and 3; and
- a display device 504 for displaying the output images of the motion-compensated image signal interpolation unit 200. This display device 506 is optional. The signal may be a broadcast signal received via an antenna or cable but may also be a signal from a storage device like a VCR (Video Cassette Recorder) or Digital Versatile Disk (DVD). The signal is provided at the input connector 510. The image processing apparatus 500 might e.g. be a TV. Alternatively the image processing apparatus 500 does not comprise the optional display device but provides HD images to an apparatus that does comprise a display device 506. Then the image processing apparatus 500 might be e.g. a set top box, a satellite-tuner, a VCR player or a DVD player. But it might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A motion-compensated image signal interpolation unit for generating an interpolated image intermediate a first image and a second image, the interpolated image being located at a first predetermined temporal distance ($\alpha$) from the first image and being located at a second predetermined temporal distance ($1-\alpha$) from the second image, the interpolation unit comprising:
- a motion estimation unit for furnishing a first motion vector and a second motion vector relating to the first image and the second image, respectively;
- a first sample generation unit generating a first group of samples based on the values of the pixels in the first image, the first motion vector and a first quotient wherein the first quotient is equal to a first spatial distance between a first one of the samples of the first group of samples and a second one of the samples of the first group of samples and the first predetermined temporal distance ($\alpha$);
- a second sample generation unit generating a second group of samples based on the values of the pixels in the second image, the second motion vector and a second quotient wherein the second quotient is equal to a second spatial distance between a first one of the samples of the second group of samples and a second one of the samples of the second group of samples and the second predetermined temporal distance ($1-\alpha$); and
- a filter that ordered statistical filters the samples of the first and the second group to produce a first value of a first pixel of the interpolated image, whereby the first quotient is substantially equal to the second quotient.

2. The motion-compensated image signal interpolation unit as claimed in claim 1, whereby the filter includes a median filter.

3. The motion-compensated image signal interpolation unit as claimed in claim 2, whereby the filter includes a weighted median filter.

4. The motion-compensated image signal interpolation unit as claimed in claim 3, whereby a particular weighting coefficient of the weighted median filter for weighting a particular sample of the first group of samples is higher than each of the further weighting coefficients for weighting further respective samples of the first group of samples, the particular sample being located in the center of the first group of samples.

5. The motion-compensated image signal interpolation unit as claimed in claim 4, whereby the particular weighting coefficient is higher than a sum of the further weighting coefficients.

6. The motion-compensated image signal interpolation unit as claimed in claim 1, whereby a second value corresponding to the first one of the samples of the first group equals a third value of a third one of the pixels of the first image.

7. The motion-compensated image signal interpolation unit as claimed in claim 1, whereby a second value corresponding to the first one of the samples of the first group is computed by means of interpolation of a third value of a third one of the pixels of the first image and a fourth value of a fourth one of the pixels of the first image in a spatial environment of the third one of the pixels.

8. The motion-compensated image signal interpolation unit as claimed in claim 1, whereby a direction of a line segment, connecting the first one of the samples of the first group and the second one of the samples of the first group, corresponds with the first motion vector.

9. The motion-compensated image signal interpolation unit as claimed in claim 1, whereby a direction of a line segment, connecting the first one of the samples of the first group and the second one of the samples of the first group, corresponds with a difference vector, the difference vector corresponding to a difference between the first motion vector and a third motion vector in a spatial environment of the first motion vector.

10. The motion-compensated image signal interpolation unit as claimed in claim 1, further comprising an edge-detection unit that detects an orientation of an edge in the first image and whereby a direction of a line segment, connecting the first one of the samples of the first group and the second one of the samples of the first group, is orthogonal to the orientation of the edge.

11. A image processing apparatus comprising:
an input connector that receives an image signal representing a first and a second image; and
a motion-compensated image signal interpolation unit coupled to the input connector, that generates an interpolated image intermediate the first and the second image, the interpolated image being located at a first predetermined temporal distance from the first image and being located at a second predetermined temporal distance from the second image, the interpolation unit as claimed in claim 1.

12. The image processing apparatus as claimed in claim 11, further comprising a display device for displaying the interpolated image.

13. A method of generating an interpolated image intermediate a first image and a second image, the interpolated image being located at a first predetermined temporal distance from the first image and being located at a second predetermined temporal distance from the second image, the method comprising:
furnishing a first motion vector and a second motion vector relating to the first image and the second image, respectively;
generating a first group of samples based on the values of the pixels in the first image, the first motion vector and a first quotient wherein the first quotient is equal to a first spatial distance between a first one of the samples of the first group of samples and a second one of the samples of the first group of samples and the first predetermined temporal distance ($\alpha$);
generating a second group of samples based on the values of the pixels in the second image, the second motion vector and a second quotient wherein the second quotient is equal to a second spatial distance (x2) between a first one of the samples of the second group of samples and a second one of the samples of the second group of samples and the second predetermined temporal distance ($1-\alpha$); and
ordered statistical filtering of the samples of the first and the second group to produce a first value of a first pixel of the interpolated image whereby the first quotient is substantially equal to the second quotient.

14. A computer program product to be loaded by a computer arrangement, comprising instructions to generate an interpolated image intermediate a first and a second image, the interpolated image being located at a first predetermined temporal distance from the first image and being located at a second predetermined temporal distance from the second image, the computer arrangement comprising processing means and a memory, the computer program product, after being loaded, providing said processing means with the capability to carry out:
furnishing a first motion vector and a second motion vector relating to the first image and the second image, respectively;
generating a first group of samples based on the values of the pixels in the first image, the first motion vector and a first quotient wherein the first quotient is equal to a first spatial distance between a first one of the samples of the first group of samples and a second one of the samples of the first group of samples and the first predetermined temporal distance ($\alpha$);
generating a second group of samples based on the values of the pixels in the second image, the second motion vector and a second quotient wherein the second quotient is equal to a second spatial distance between a first one of the samples of the second group of samples and a second one of the samples of the second group of samples and the second predetermined temporal distance ($1-\alpha$); and
ordered statistical filtering of the samples of the first and the second group to produce a first value of a first pixel of the interpolated image, whereby the first quotient is substantially equal to the second quotient.

15. A motion-compensated image signal interpolation unit for generating an interpolated image intermediate a first image and a second image, the interpolated image being located at a first predetermined temporal distance ($\alpha$) from the first image and being located at a second predetermined temporal distance ($1-\alpha$) from the second image, the interpolation unit comprising:
motion estimation means for furnishing a first motion vector and a second motion vector relating to the first image and the second image, respectively;
first sample generation means for generating a first group of samples based on the values of the pixels in the first image, the first motion vector and a first quotient wherein the first quotient is equal to a first spatial distance between a first one of the samples of the first group of samples and a second one of the samples of the first group of samples and the first predetermined temporal distance ($\alpha$);
second sample generation means for generating a second group of samples based on the values of the pixels in the second image, the second motion vector and a second quotient wherein the second quotient is equal to a second spatial distance (x2) between a first one of the samples of the second group of samples and a second one of the samples of the second group of samples and the second predetermined temporal distance ($1-\alpha$); and
filtering means for ordered statistical filtering of the samples of the first and the second group to produce a first value of a first pixel of the interpolated image, whereby the first quotient is substantially equal to the second quotient.

16. The motion-compensated image signal interpolation unit of claim 1, wherein the filtering means includes a median filter.

17. The motion-compensated image signal interpolation unit of claim 1, wherein the filtering means includes a weighted median filter.

18. The motion-compensated image signal interpolation unit of claim 17, whereby a particular weighting coefficient of the weighted median filter for weighting a particular sample of the first group of samples is higher than each of the further weighting coefficients for weighting further respective samples of the first group of samples, the particular sample being located in the center of the first group of samples.

19. The motion-compensated image signal interpolation unit of claim 18, whereby the particular weighting coefficient is higher than a sum of the further weighting coefficients.

* * * * *